United States Patent [19]

Roedel

[11] 4,069,560
[45] Jan. 24, 1978

[54] MEASURING APPARATUS

[76] Inventor: Richard K. Roedel, 14217 N. Bismark Ave., Woodbridge, Va. 22193

[21] Appl. No.: 679,401

[22] Filed: Apr. 22, 1976

Related U.S. Application Data

[62] Division of Ser. No. 534,055, Dec. 18, 1974, Pat. No. 3,975,827.

[51] Int. Cl.² .............................................. A44B 21/00
[52] U.S. Cl. ................................. 24/255 R; 24/259 R
[58] Field of Search ........... 24/255 R, 255 AS, 255 S, 24/255 FC, 255 TV, 259 R, 259 FC, 259 SH, 262 R, 243 R; 248/226 E

[56] References Cited

U.S. PATENT DOCUMENTS

| 358,675 | 3/1887 | Kenyon et al. | 24/259 FC |
| 447,981 | 3/1891 | Shurman | 24/259 R |
| 803,819 | 11/1905 | Getz | 24/255 R |
| 1,212,185 | 1/1917 | Cobb | 248/226 E |
| 2,696,965 | 12/1954 | Maxwell | 248/226 E |
| 2,881,766 | 4/1959 | Tornsjo | 24/259 FC |
| 3,349,454 | 10/1967 | Thomson | 24/259 FC |

*Primary Examiner*—Paul R. Gilliam
*Assistant Examiner*—Kenneth J. Dorner
*Attorney, Agent, or Firm*—William G. Gapcynski; Lawrence A. Neureither; Frank R. Agovino

[57] ABSTRACT

Apparatus for use with graphic material supported on a planar surface. Two identical clamps, upon which a reeling means is mounted, are connected by a tape and mounted on the edge of the planar surface. The clamps are U-shaped and have a longitudinal slit in one leg. On the other leg a spool means supported by a housing is attached by a bracket. Each end of the tape is threaded through the slit, around the clamp and connected to the spool means.

1 Claim, 4 Drawing Figures

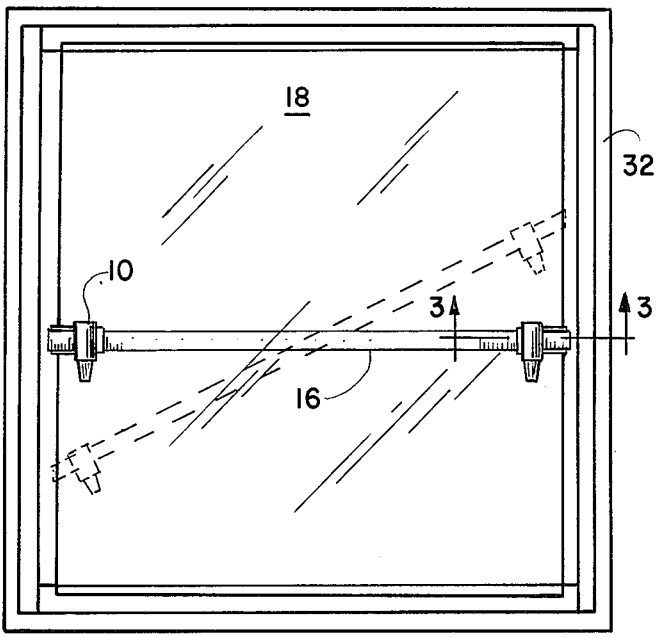
FIG. 1.
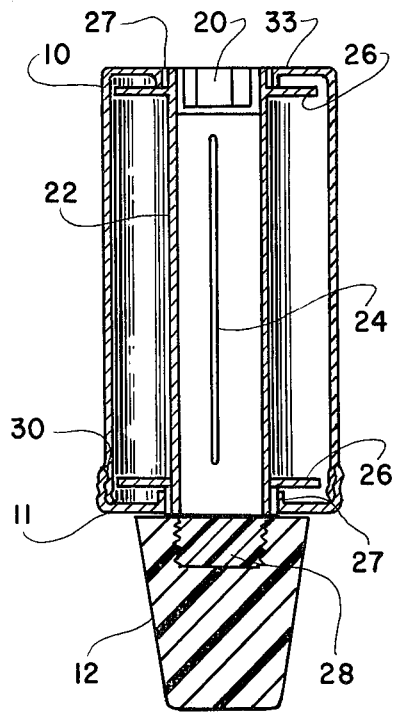
FIG. 4
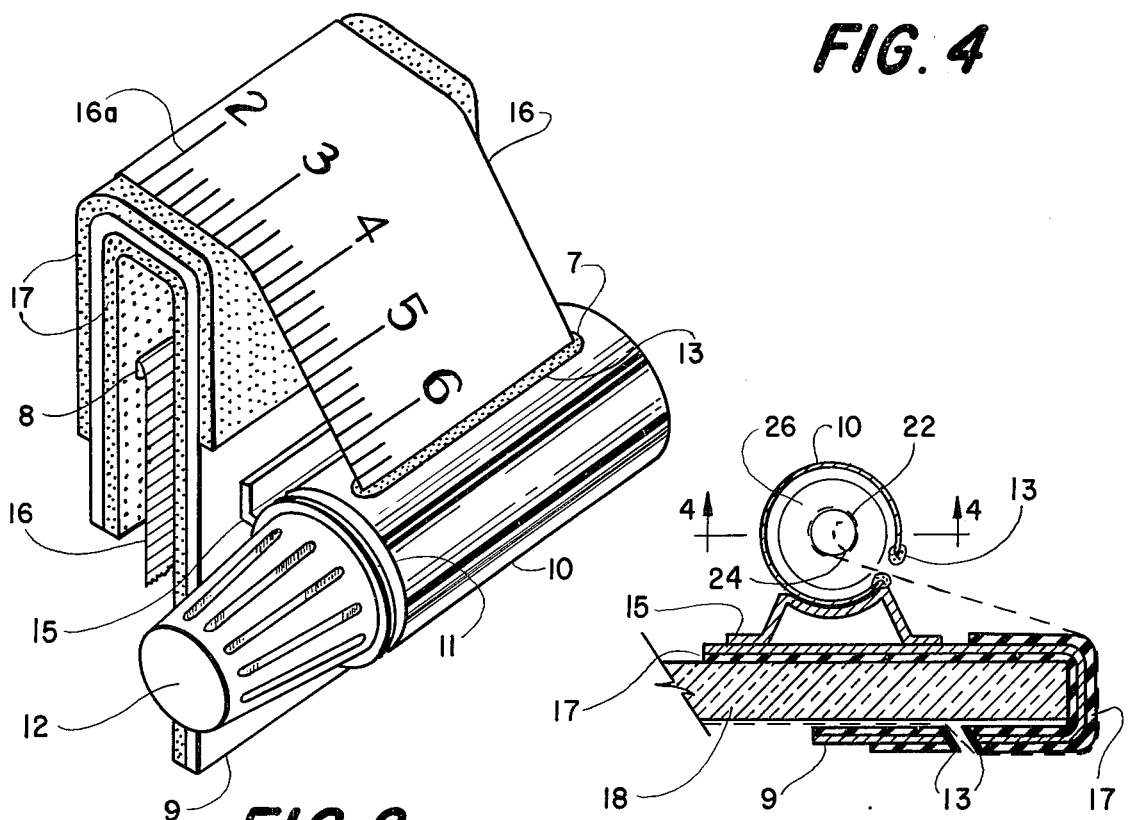
FIG. 2.
FIG. 3.

MEASURING APPARATUS

The invention described herein may be manufactured and used by or for the Government for governmental purposes without the payment of any royalty thereon.

This is a division, of application Ser. No. 534,055, now Pat. No. 3,975,827, filed Dec. 18, 1974.

BACKGROUND OF THE INVENTION

1. Field of the Invention

This invention relates to graphic art and deals, more specifically, with an apparatus for positioning a tape, such as a transparent scale, adjacent to a planar surface, such as a drafting board, shadow-box or, more particularly, the ground glass located at the focal plane of a photomechanical or photostat-type camera.

2. Description of the Prior Art

The prior art discloses many devices which are mounted on a drafting board as an aid to drawing. Most prominent is a horizontal or vertical tape of fixed length which can be moved across the surface of the board, such as disclosed in U.S. Pat. No. 1,351,534. These types of appliances are mounted parallel to the edges of the drafting board and allow movement of the tape lengthwise or longitudinally and crosswise or transversely of the board. However, these former inventions do not provide for temporary attachment to the drafting board and do not allow for angular or diagonal placement of the tape. These restrictions have rendered appliances which are not adaptable for use on the ground glass located at the focal plane of photomechanical or photostatic-type cameras. Therefore, measuring images for metric quality at the focal plane requires time consuming conventional slide rule calculations or manual scaling on the back of the ground glass.

SUMMARY OF THE INVENTION

The invention comprises a pair of padded U-shaped clamps. One leg of each clamp has a slit in it and the other leg has attached to it by a bracket a spool supported by a housing. One end of the tape is wound around one spool, threaded around the clamp through the slit to the other clamp where it is engaged in the same manner. The use of the clamp arrangement permits the tape to be placed horizontally or diagonally relative to the boundaries of the planar surface on which the graphic material is supported.

It is the object of this invention to provide a novel clamping means which allows temporary positioning of a tape adjacent to a drafting board, ground glass or similar planar surface used in graphic arts.

A further object of this invention is to provide an apparatus for use on a planar surface which permits positioning of a tape adjacent to the surface at any angle with the edges of the surface.

A further object is to provide an apparatus to measure photographic images on the ground glass located at the focal plane of photomechanical or photostat-type cameras.

BRIEF DESCRIPTION OF THE DRAWINGS

Other objects and features of this invention will become apparent to those skilled in the art by referring to the preferred embodiment described in the following specification and shown in the accompanying drawings in which:

FIG. 1 is a plan view of the apparatus mounted on a ground glass located at the focal plane of a camera;

FIG. 2 is an enlarged oblique view of one end of the apparatus unmounted;

FIG. 3 is an enlarged fragmentary sectional view of one end of the apparatus mounted on the edge of the ground glass taken along line 3—3 of FIG. 1; and FIG. 4 is an enlarged sectional view showing only the reeling means of the U-shaped clamp taken along line 4—4 of FIG. 3.

DESCRIPTION OF THE PREFERRED EMBODIMENT

Referring to the drawing, the graduated tape assembly, as illustrated in FIG. 1, is mounted, for example, at the rear of a conventional photostat-type camera 32 by placing the U-shaped clamps 9 on the edges of the ground glass 18 located at the focal plane. The measuring tape 16 or linear means, which is transparent and interchangeable, can be moved across the ground glass 18, extended or retracted by reeling the tape 16 by turning the knobs 12. This allows any portion of the scale 16a to be visible and in contact with the ground glass 18. The tape 16 is used to measure photographic images or other graphic displays which appear on the ground glass 18. As the image appears, regardless of its position, the tape can be arranged to make an accurate measurement. To accommodate any projected image a bias or angular position can be readily obtained by adjusting the U-shaped clamps 9. The tape 16 adheres to the ground glass 18 by naturally generated static charge through friction caused by the movement of the tape 16 across the ground glass 18, and by tautness created in the tape 16 by rotating the knobs 12 in opposite directions.

Referring to FIG. 2, the foam rubber backing 17 which covers clamps 9 provides a frictional means to keep the tape 16 from slipping in position, and to prevent slippage of the clamps 9 along the edges of the ground glass 18. Felt 13 covers the longitudinal slits 7 and 8 in the housing 10 and the clamps 9, respectively so that the tape is not damaged while being rolled or unrolled. Housing 10 is supported on the clamp 9 by bracket 15.

Referring to FIG. 3, discs 26 are located at the ends of the spool 22 to guide the tape 16 on and off the cylinder portion of spool 22 and hold the spool 22 centered within the housing 10. Mounting means, such as resilient bearings 27 are located in a centered opening of the closed end 33 of the housing 10 and in the centered opening in the housing cap 11. The bearings 27 support the spool 22. Spool end 28 extends beyond the threaded housing cap 11 to threadably engage the knob 12, which is internally threaded. The other spool end 22 is provided with a hexagonal recess 20. One end of the housing 10 is provided with external threads 30 so the housing cap 11, which is threaded internally, can easily be removed.

Referring to FIG. 4, longitudinal slit 24 in spool 22 is provided as a means for engaging the tape 16 and to allow easy threading, unthreading and exchange of the tape 16.

To remove tape 16, knobs 12 are rotated until the entire tape 16 is unwound. The tape 16 is then pulled out of slits 7 and 24 around the bight portion of the clamp 9 and out of slot 8.

To remove the spool 22 a hexagonal wrench is placed in recess 20 to hold spool 22 in place while knob 12 is unscrewed and removed. Housing cap 11 is then unscrewed and removed, permitting access to and removal of spool 22.

To re-thread tape 16, each end should be threaded through slit 8 and around clamp 9. Knob 12 is turned until slit 24 is lined up with slit 7. The tape 16 is threaded through both slits 7 and 24 and knob 12 is turned until the spool 22 engages tape 16.

Although I have here described the preferred embodiment of my novel invention, many variations and modifications will now be apparent to those skilled in the art, and I therefore prefer to be limited, not by the specific disclosure herein, but only by the appending claims.

I claim:

1. Clamping means adapted to engage the edge of a base member having planar surfaces comprising a U-shaped, formable, laminated member, one leg of said U-shaped member having a slit therein extending transverse the longitudinal axis of the clamp leg, a first soft backing between the base member and said U-shaped member when the clamp is applied to the base member, a second soft backing attached exteriorly to said U-shaped member and soft backing bounding said slit whereby a linear means wrapped around the outside of the U-shaped member, threaded through the slit and extended to the edge of the clamp leg contacts only soft backing.

* * * * *